United States Patent [19]

Nakamura et al.

[11] Patent Number: 5,548,370
[45] Date of Patent: Aug. 20, 1996

[54] VIBRATION COMPENSATION DEVICE FOR A CAMERA

[75] Inventors: Toshiyuki Nakamura, Tokyo; Yoshikazu Iida, Chigasaki, both of Japan

[73] Assignee: Nikon Corporation, Tokyo, Japan

[21] Appl. No.: 330,802

[22] Filed: Oct. 28, 1994

[30] Foreign Application Priority Data

Oct. 29, 1993 [JP] Japan .................................. 5-272627

[51] Int. Cl.⁶ .............................. G03B 7/08; G03B 13/36
[52] U.S. Cl. ............................................ 354/402; 354/430
[58] Field of Search ..................................... 354/430, 202, 354/400, 402

[56] References Cited

U.S. PATENT DOCUMENTS 5,335,042  8/1994  Imafuji .................................. 354/430

Primary Examiner—W. B. Perkey

[57] ABSTRACT

A vibration compensation device for detecting vibration in an optical system, particularly vibration of a camera caused by hand tremor, during light measurement or during focal point adjustment information detection, and minimizing the effect of vibration by repeating light measurement or focal point adjustment information detection. The vibration compensation device includes a photographic lens, angular velocity detection circuits, a decision unit including a CPU, a light measurement device, an autofocus (AF) device, motor drive circuits, motors, and lens position detection circuits. Light measurement is performed using the light measurement device and focal point adjustment information detection is performed by the AF device when a release button is pressed halfway. Light measurement or focal point adjustment information detection is repeated as if vibration is detected by angular velocity detection circuits during light measurement or during focal point adjustment information detection. If vibration is not detected during a measurement or detection operation before a specified number of repetitions is performed, the light measurement value or focal point adjustment information detection value at that time is adopted. If vibration is detected during each of the specified number of repetitions, the light measurement value or the focal point adjustment information detection value is determined based on the average value of the light measurement values and the average value of the focal point adjustment information detection values, respectively. In alternative embodiments, photography may be prohibited when vibration is detected during each of the specified number of repetitions; photography may be prohibited until the release button is pressed again; or the last light measurement value or focal point detection information value may be used.

24 Claims, 7 Drawing Sheets

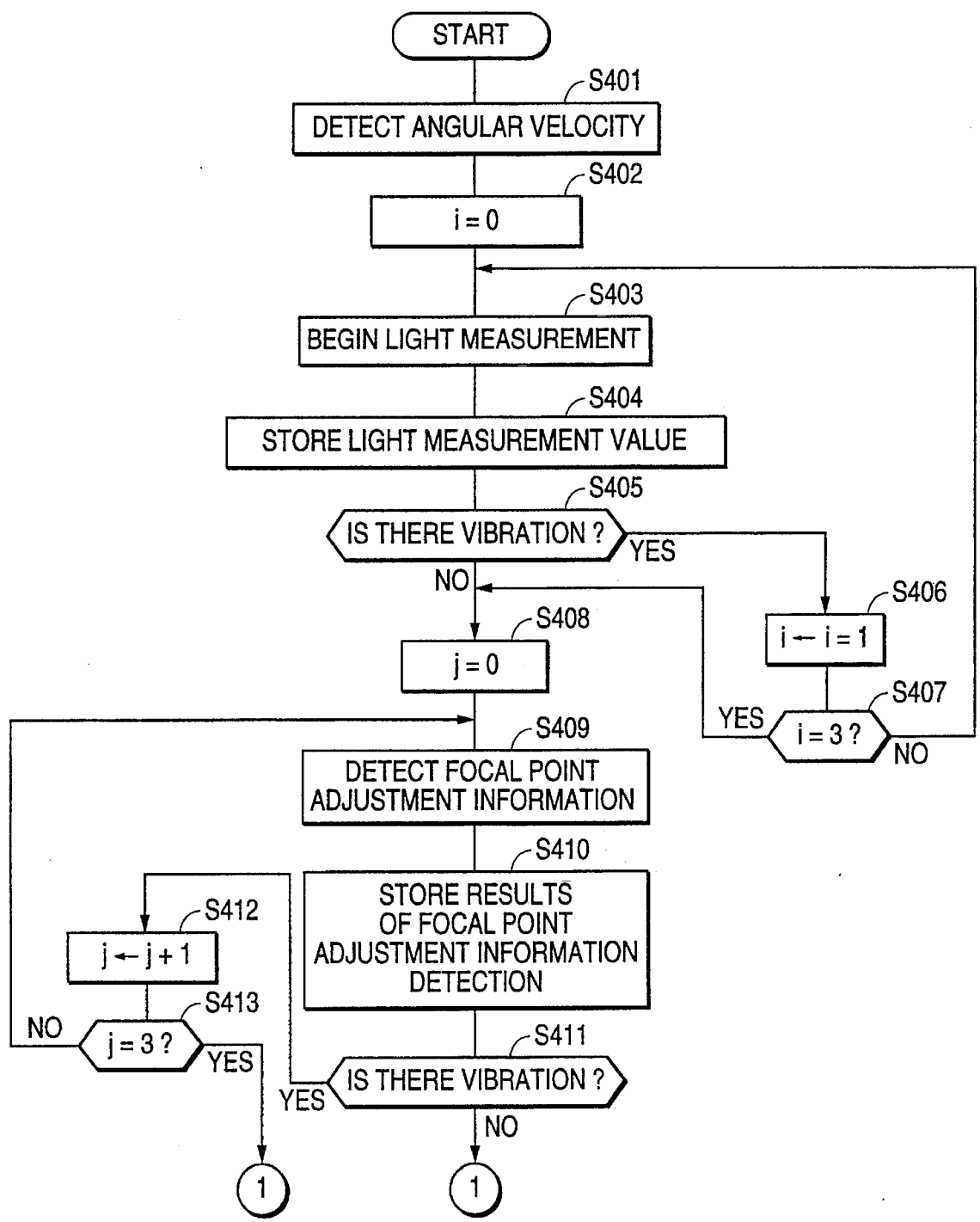

VIBRATION COMPENSATION DEVICE FOR A CAMERA

BACKGROUND OF THE INVENTION

1. Field of the Invention

The present invention relates to a vibration compensation device for compensating for vibration of an optical system and, more particularly, to a vibration compensation device, suitable for use in a camera which controls a light measurement operation and a focal point adjustment information detection operation such that the effect of camera vibration during these operations is minimized or eliminated.

2. Description of the Related Art

Vibration compensation cameras are known which compensate for vibration caused by hand tremor and the like. In particular, vibration compensation cameras are known which compensate for vibration by continuously detecting the vibration during a period starting when a release button is fully depressed and ending when a shutter curtain has closed, and by moving a compensation lens provided in a photographic optical system in a direction opposite to the direction of the detected vibration. Further, cameras are known having both a light measurement function for measuring subject brightness using light receiving elements inside the camera and an automatic focal point detection function for measuring information relating to focal point adjustment when the release button is half depressed. The focal point adjustment information is measured, for example, by irradiating a subject with infrared light from the camera and detecting the infrared light which is reflected from the subject using the light receiving elements. When vibration is produced in the known types of vibration compensation cameras, the amount of light received by the light receiving elements changes, and the results of both the subject brightness measurement and the focal point adjustment information detection also change. However, because the known vibration compensation cameras do not revise the results of subject brightness measurement and the results of focal point adjustment information detection when hand vibration is detected during these measurements, lack of focus and exposure discrepancies can easily occur.

SUMMARY OF THE INVENTION

Accordingly, it is an object of the present invention to provide a vibration compensation device for detecting vibration of an optical system occurring during light measurement or during focal point adjustment information detection.

It is another object of the present invention to provide a vibration compensation device for detecting vibration of an optical system wherein light measurement or focal point adjustment information detection is repeated if vibration is detected during light measurement or focal point adjustment information detection.

It is a further object of the present invention to provide a vibration compensation device for detecting vibration of an optical system in a camera wherein an average value of a plurality of light measurement operations or a plurality of focal point adjustment information detection operations is used during photography if vibration is detected during each of the plurality of light measurement or focal point adjustment information detection operations.

It is another object of the present invention to provide a vibration compensation device for detecting vibration of a camera wherein photography is prohibited if vibration is detected during a plurality of successive light measurement operations or during a plurality of successive focal point adjustment information detection operations.

It is another object of the present invention to provide a vibration compensation device for detecting vibration of a camera and for prohibiting photography until a release button is half pressed again when vibration is detected during each of a plurality of successive light measurement operations or each of a plurality of successive focal point adjustment information detection operations.

It is another object of the present invention to provide a vibration compensation device for detecting vibration of a camera wherein a most recent light measurement value and a most recent focal point adjustment information detection value are used during photography if vibration is detected during a plurality of successive light measurement operations and during a plurality of successive focal point adjustment information detection operations.

Additional objects and advantages of the invention will be set forth, in part, in the description which follows, and, in part, will be obvious from the description, or may be learned by practice of the invention.

Objects of the present invention are attained by providing a vibration compensation device, suitable for use in a camera, including a light measurement device to measure subject brightness when a release button is pressed halfway; a focal point adjustment information detection device to detect information relating to focus adjustment when the release button is pressed halfway; a vibration detection device to detect vibration; a vibration compensation device to compensate for vibration and a decision unit to determine a light measurement value and a focal point adjustment information detection value to be used during photography.

In accordance with a first embodiment of the present invention, the light measurement and focal point adjustment information detection operations are repeated each time vibration is detected during light measurement and during focal point adjustment information detection, respectively. If vibration is not detected during a light measurement operation or during a focal point adjustment information detection operation, the value measured or detected when no vibration is occurring is used during photography. However, if the light measurement or focal point adjustment information detection operations are repeated a predetermined number of times and vibration is detected during each of the predetermined number of repetitions, an average value of the light measurements and focal point adjustment information detections is used during photography.

In accordance with a second embodiment of the present invention, after a release button is half pressed to initiate light measurement and focal point adjustment information detection, if vibration is detected by the vibration detection device during each of a predetermined number of light measurements or focal point adjustment information detections, photography is prohibited until the release button is half pressed again.

In accordance with a third embodiment of the present invention, if vibration is detected during a predetermined number of light measurement operations or focal point adjustment information detection operations photograph is simply prohibited.

In accordance with a fourth embodiment of the present invention, the light measurement value or the focal point adjustment information detection value selected to be used during photography is the light measurement value most recently measured or the focal point adjustment information detection value most recently detected if vibration is detected a predetermined number of times in succession while performing light measurement or focal point adjustment information detection.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIG. 7 is a flow chart showing an operational process for vibration compensation in accordance with a fourth embodiment of the present invention.

DESCRIPTION OF THE PREFERRED EMBODIMENTS

Figure 1:
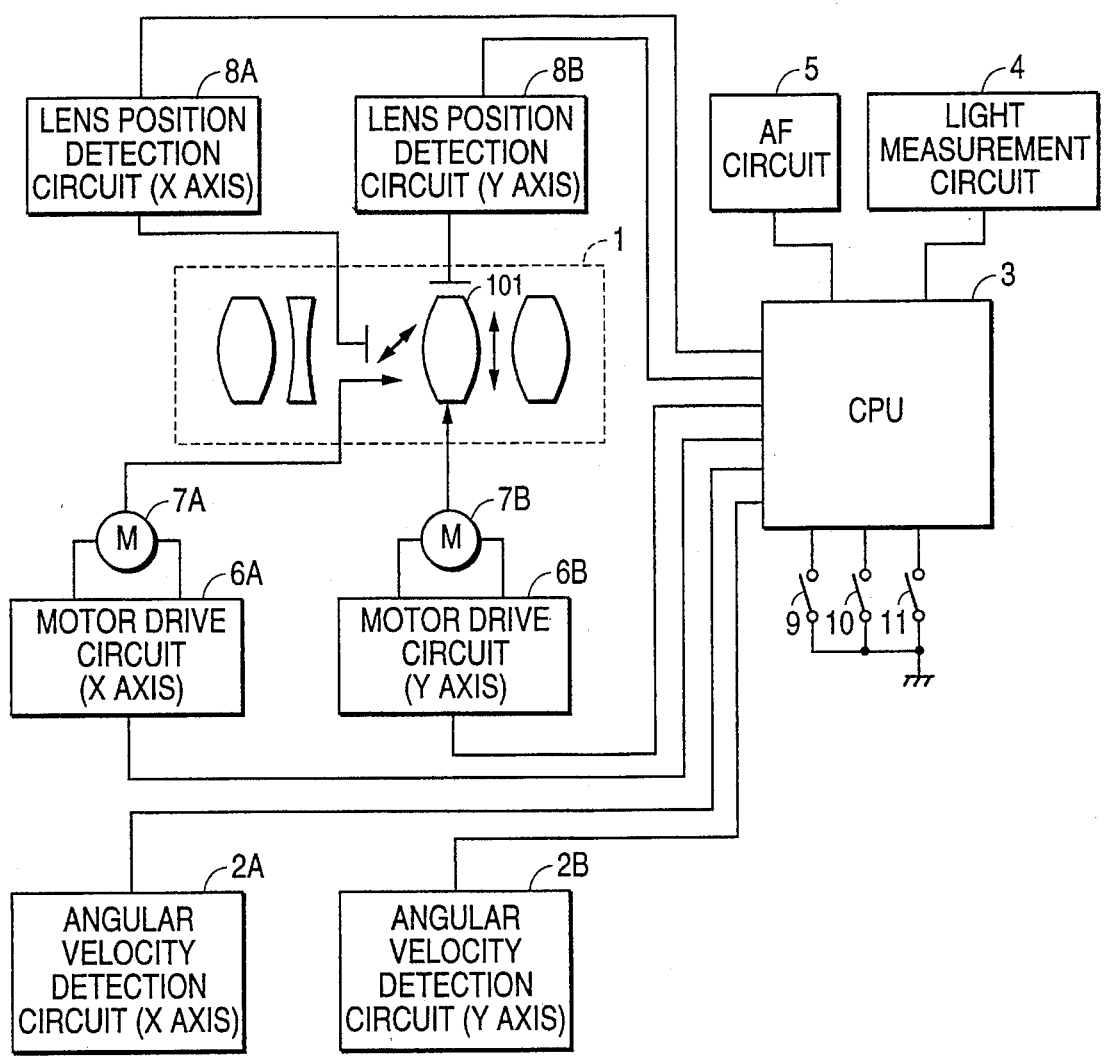
FIG. 1 is a block diagram showing a vibration compensation device for an optical system in accordance with preferred embodiments of the present invention.

Reference will now be made in detail to the preferred embodiments of the present invention, examples of which are illustrated in the accompanying drawings, wherein like reference numerals refer to the same or similar elements throughout.

FIG. 1 is a block diagram showing a vibration compensation device for compensating for vibration in an optical system in accordance with preferred embodiments of the present invention. Although the present invention will be described with respect to compensating for vibration in a camera, it will be recognized that the vibration compensation device in accordance with the present invention may be used to compensate for vibration in any device including an optical system.

As shown in FIG. 1, the vibration compensation device includes a compensation lens 101 which is one of four lenses making up a photographic lens 1. The compensation lens 101 is capable of movement in the X-axis direction and in the Y-axis direction to compensate for vibration, particularly vibration caused by hand tremor when holding a camera. The X-axis and the Y-axis intersect at right angles and have the optical axis of the photographic lens 1 as the origin point. Angular velocity detection circuits 2A and 2B detect vibration of the camera in the X-axis direction and the Y-axis direction, respectively, and, in particular, detect vibration of the compensation lens 101. The angular velocity detection circuits 2A and 2B output signals corresponding to detected vibration which are converted to digital signals and input to a control unit 3. The control unit 3 includes a decision unit 3A which determines a light measurement value and a focal point adjustment information value to be used during photography. The control unit 3 includes a CPU which is preferably a single chip microcomputer controlling all processing within the camera, including vibration compensation processing.

A light measurement device 4 measures the subject brightness when a release button (not shown in the figure) is pressed halfway. An autofocus device 5 (hereinafter referred to as an "AF device") detects focal point adjustment information when the release button is pressed halfway. The AF device 5 may be a device which measures the distance to a subject, or a device which detects an in-focus state based on the photographic lens. The light measurement value measured by light measurement device 4 and the focal point adjustment information detection results detected by the AF device 5 are input to the control unit 3 and to the decision unit 3A.

Motor drive circuits 6A and 6B receive pulse control signals from the control unit 3 and, based upon the received pulse control signals, the motors 7A and 7B are driven to move the compensation lens 101 in the X-axis direction and in the Y-axis direction, respectively. The motor drive circuits 6A and 6B drive the motors 7A and 7B, respectively, in accordance with the duty ratio of the pulse control signals that are input from the control unit 3. More specifically, the control unit 3 modifies the rotational velocity of motors 7A and 7B by changing the duty ratios of the respective pulse signals supplied to motor drive circuits 6A and 6B. The rotation of motors 7A and 7B is converted to linear movement by a compensation lens drive system (not shown in the figure) and the compensation lens 101 is moved in the X-axis direction and the Y-axis direction, respectively.

The position of the compensation lens 101 is detected optically by photointerrupters (not shown in the figure). The detection results of the photointerrupters are pulse signals which are sent to lens position detection circuits 8A and 8B which determine the direction of movement and the amount of movement of the compensation lens 101 in the X-axis direction and the Y-axis direction, respectively. The outputs of the lens position detection circuits 8A and 8B are then sent to the control unit 3.

The control unit 3 determines the direction of movement and the amount of movement of the compensation lens 101 resulting from vibration based on the angular velocity detected by angular velocity detection circuits 2A and 2B, and sends pulse signals to motor drive circuits 6A and 6B. Further, the pulse signals from the lens position detection circuits 8A and 8B are input to the control unit 3 to determined whether the compensation lens is moved as directed. By measuring the pulse frequency of the pulse signals input to control unit 3, the position and amount of movement of the compensation lens 101 in the X-axis direction and Y-axis direction, respectively, are detected, and the movement velocity of compensation lens 101 is detected from the amount of movement of the compensation lens 101 over a fixed period of time.

Three switches for controlling camera action are also connected to the control unit 3, including a main switch 9 which supplies power to all pans of the camera when it is switched ON; a half-push switch 10 which is switched ON when the release button is pressed halfway; and a full-push switch 11 which is switched ON when the release button is fully pressed.

Figure 2:
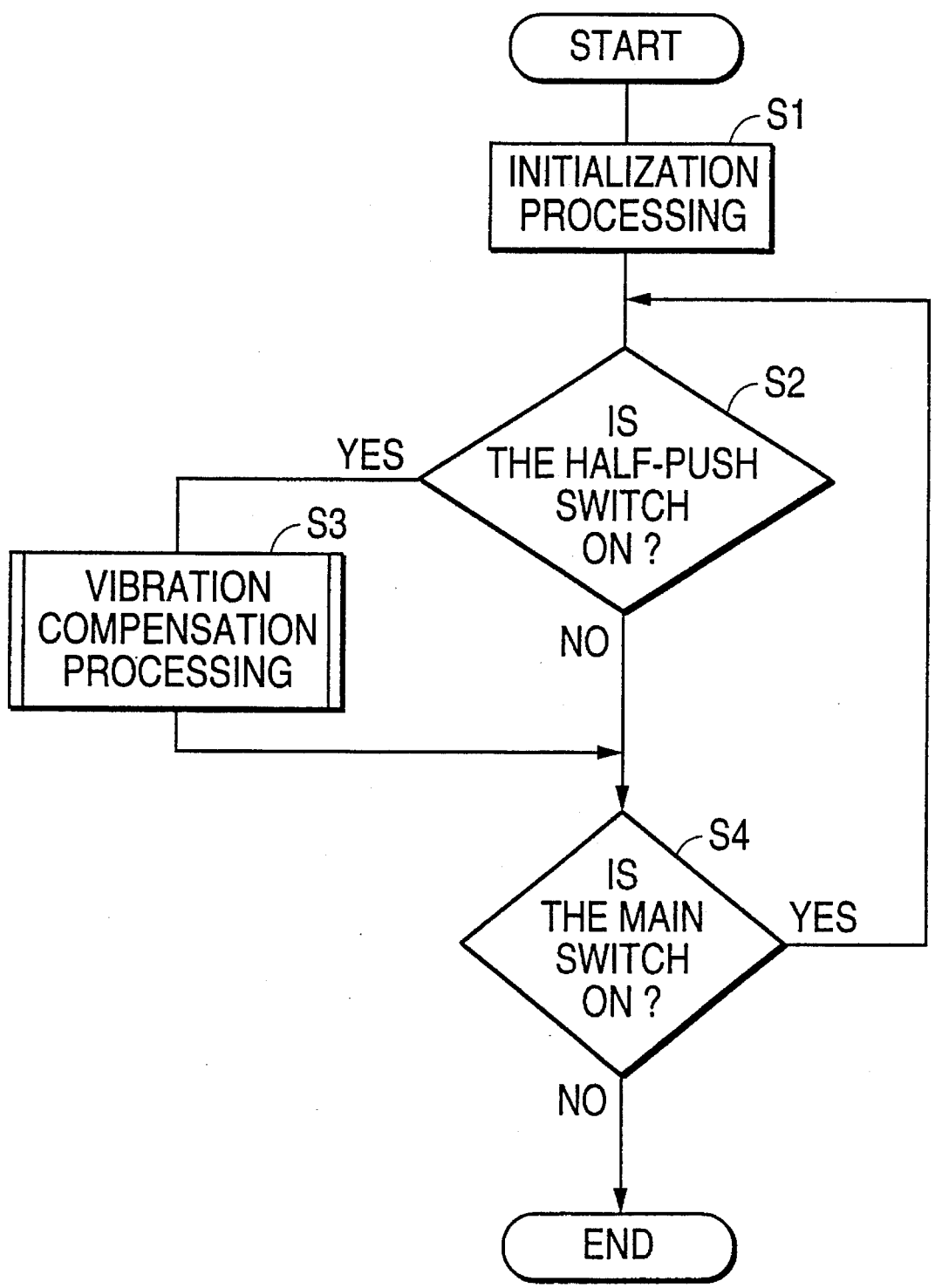
FIG. 2 is a flow chart showing a main operational process for performing vibration compensation in accordance with the preferred embodiments of the present invention.

FIG. 2 is a flow chart showing a main operational process for performing vibration compensation using the vibration compensation device shown in FIG. 1 in accordance with the preferred embodiments of the present invention.

According to the operational process shown in FIG. 2, vibration compensation processing is performed when the half-push switch 10 is ON (i.e., when the release button is half pressed). Specifically, the operational process starts when the main switch 9, for supplying power to all parts of the camera, has been switched ON. After the main switch 9 has been switched ON, processing is initialized (step S1) within the control unit 3. It is then determined (step S2) whether or not half-push switch 10 is ON. If the half-push switch 10 is ON, vibration compensation processing, which will be described in detail below with reference to FIGS. 3–7, is conducted (step S3), and it is then determined (step S4) whether or not the main switch 9 is ON. However, if it is determined that the half-push switch 10 is not ON (step S2), then the operational process proceeds directly to step S4 to determine whether the main switch 9 is ON. If the decision in step S4 is affirmative, the operational process returns to step S2; however, if the decision in step S4 is negative, the operational process ends.

Figure 3:
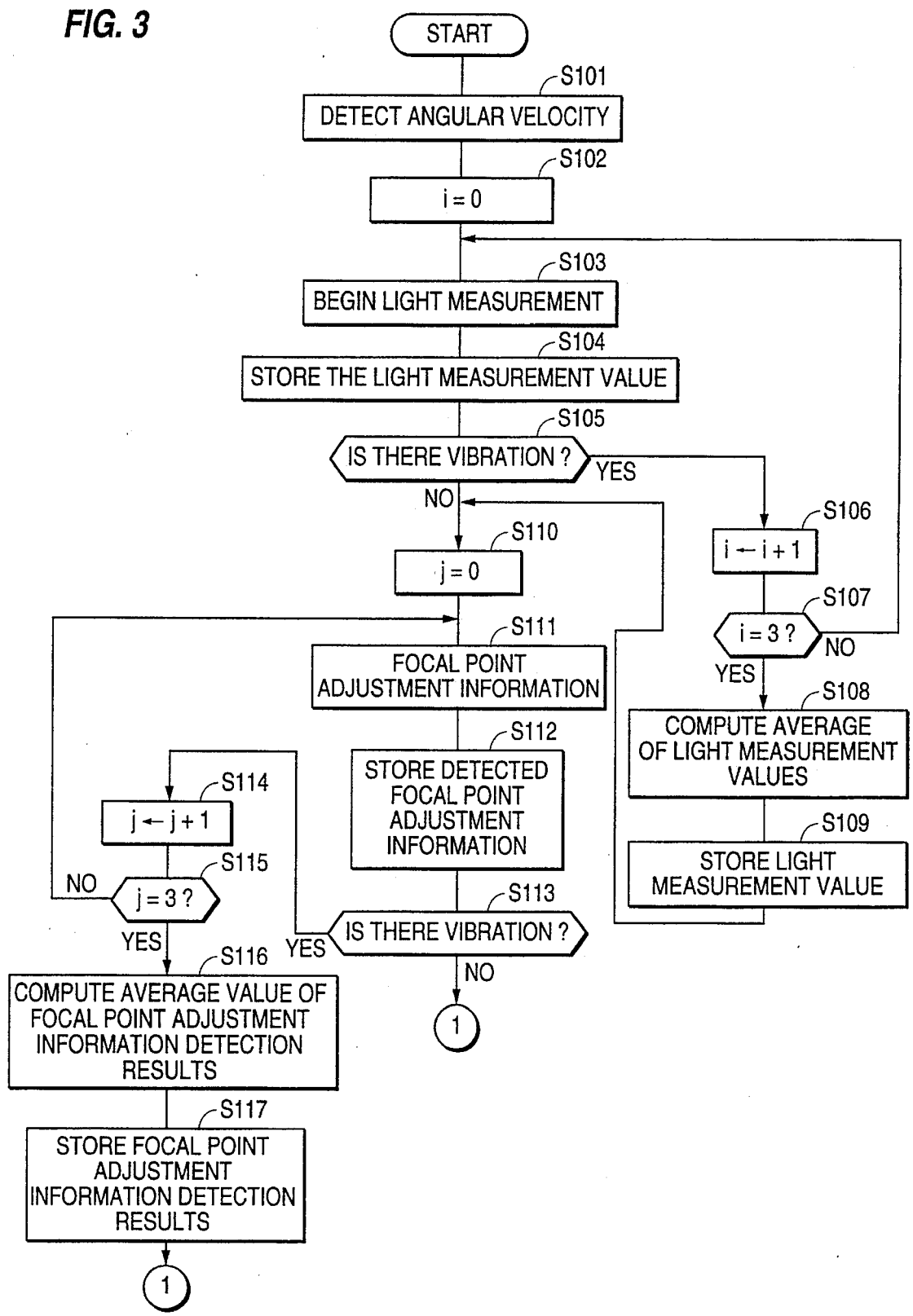
FIG. 3 is a flow chart showing an operational process for vibration compensation in accordance with the first embodiment of the present invention.
Figure 4:
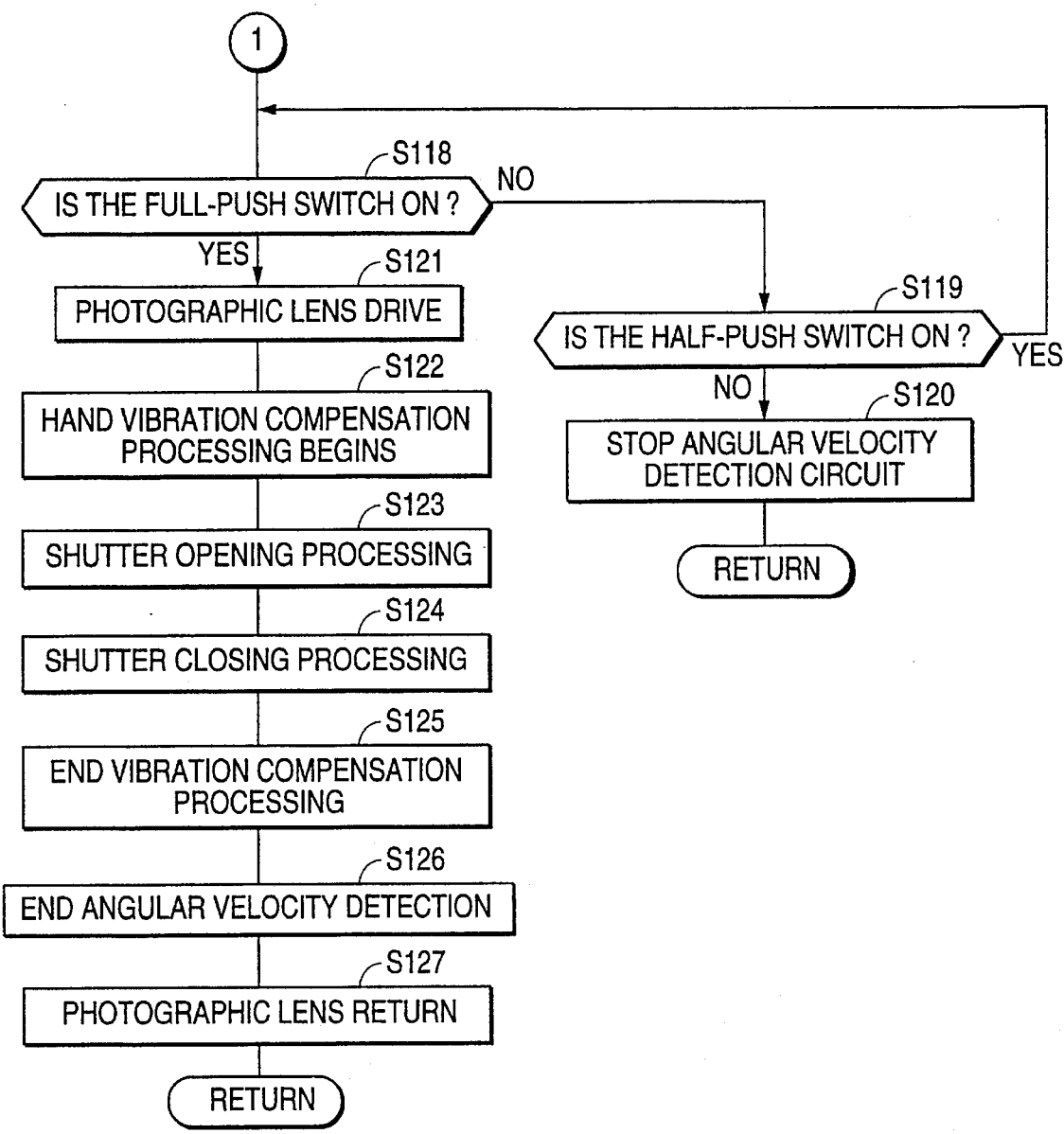
FIG. 4 is a flow chart which continues the operational process shown in FIG. 3.

Referring now to the flow charts shown in FIG. 3 and FIG. 4, an operational process is shown for performing the vibration compensation conducted in step S3 of FIG. 2 in accordance with a first embodiment of the present invention. First, the angular velocity detection circuits 2A and 2B begin detection (step S101) of the angular velocity of the vibration compensation lens 101 caused by vibration. Next, a variable i for counting a number of repetitions of light measurement by the light measurement circuit is initialized to zero (step S102). The light measurement circuit 4 then begins light measurement (step S103) and the light measurement value measured by light measurement circuit 4 is stored in memory. A determination is made (step S 105), based on the output of the angular velocity detection circuits 2A and 2B, whether or not vibration has been produced during light measurement. If it is determined that vibration has been generated during light measurement, the variable i is incremented by one (1) (step S106) and it is determined (step S107) whether or not the variable i is three (3). If it is determined that the variable i is not equal to three (3), the operational process returns to step S103, and the light measurement circuit 4 begins measurement again. However, if it is determined at step S107 that the variable i is equal to three (3), indicating that light measurement values have been taken three times in succession while vibration is occurring, the three stored light measurement values are read from memory, and an average of the three light measurement values is computed (step S108). The computed average value is stored in memory (step S109) as the light measurement value to be used during photography. The operational process then proceeds to step S110 where a variable j for counting a number of repetitions of focal point adjustment information detection of the AF circuit 5 is initialized to zero (0).

If it is determined (step S105) that vibration has not been generated during light measurement, the operational process proceeds to step S110 where the variable j is initialized to zero (0). In this case, when it is determined in step S105 that vibration has not been generated during light measurement before the variable i is three (3), the light measurement value previously taken at step S104 is used as the light measurement value during photography.

After the variable j is initialized (step S110), the AF circuit 5 then begins detection (step S111) of focal point adjustment information, and the results of the focal point adjustment information detection by AF device 5 are stored in memory (step S112). It is then determined (step S113), based on the output of angular velocity defection circuits 2A and 2B, whether or not vibration has been produced during detection of the focal point adjustment information. If it is determined that vibration has been produced during the focal point adjustment information detection, the variable j is incremented by one (1) (step S114), and it is determined (step S115) whether or not the variable j is three (3). If the variable j is not equal to three (3), the operational process returns to step S111, and detection of the focal point adjustment information is performed again. However, if it is determined at step S115 that the variable j is equal to three (3), indicating that focal point adjustment information detection values have been taken three times in succession while vibration is occurring, the three stored focal point adjustment information detection values are read from memory, and an average value of the three focal point adjustment information values is computed (step S116). The computed average value is then stored in memory (step S117) as the focal point adjustment information detection value to be used during photography, and the operational process continues at step S118 (FIG. 4).

If it is determined in step S113 that vibration has not been produced during focal point adjustment information detection, the operational process proceeds to step S118, and the focal point adjustment information value stored in memory in step S112, before the variable j is three, is taken to be the focal point adjustment information value used during photography.

As shown in FIG. 4, steps S118–S127 act to perform photography using the light measurement value and focal point adjustment information value selected in steps S101–S117. In step S118, it is determined whether or not full-push switch 11 is ON. If the full-push switch 11 is not ON, it is determined (step S119) whether or not the half-push switch 10 is ON. If the half-push switch 10 is ON, the process returns to step S118; however, if the half-push switch 10 is not ON, the angular velocity detection circuits 2A and 2B terminate vibration detection (step S120), no photography is conducted and control returns to the main process shown in FIG. 2.

If the full-push switch 11 is ON (step S118) corresponding to the release button being fully pushed, the photographic lens 1 is moved (step S121) to the in-focus position based on the focal point adjustment information stored in memory. Also, the aperture (not shown) is set to a specified opening based on the light measurement value stored in memory. Next, the angular velocity of the compensation lens 101 caused by vibration is read from angular velocity detection circuits 2A and 2B, the amount of movement for compensation lens 101 is computed and pulse signals of a specific duty ratio based on the computed amount of movement are sent to motor drive circuits 6A and 6B (step S122). The compensation lens 101 is then moved by motors 7A and 7B in a direction to compensate for vibration. Furthermore, at step S122 the outputs of lens position detection circuits 8A and 8B are read, the direction of movement and the amount of movement of the compensation lens 101 is detected, and it is determined whether or not the compensation lens 101 is moved as directed. The vibration compensation processing performed in step S122 is continuously conducted until the shutter closes (step S124).

A shutter mechanism (not shown in the drawing) is then directed to release the shutter (step S123), and after a specified time has elapsed, the shutter is closed (step S124). Next, the vibration compensation processing begun in step S122 is terminated (step S125), and the angular velocity detection circuits 2A and 2B stop vibration detection (step S126). The photographic lens 1 is moved to an initial position, and the process returns to the main process shown in FIG. 2.

In accordance with the first embodiment of the invention described above, if vibration is detected during light measurement or during focal point adjustment information detection, the light measurement or focal point adjustment information detection is performed again until a light measurement value or a focal point adjustment information value is measured during which no vibration is detected or until a predetermined number of successive measurements are performed during which vibration is detected. Thus, the light measurement value and the focal point adjustment information value to be used during photography are selected either (1) in a state in which no vibration is detected, and the reliability of the light measurement value and the focal point adjustment information detection value is heightened, or (2) if vibration is detected a predetermined number of times consecutively (e.g., three times), the light measurement value or focal point adjustment information detection value is determined by computing an average value of the three light measurement results or focal point adjustment information detection results, and the error in the light measurement value and the focal point adjustment information detection value is minimized.

Figure 5:
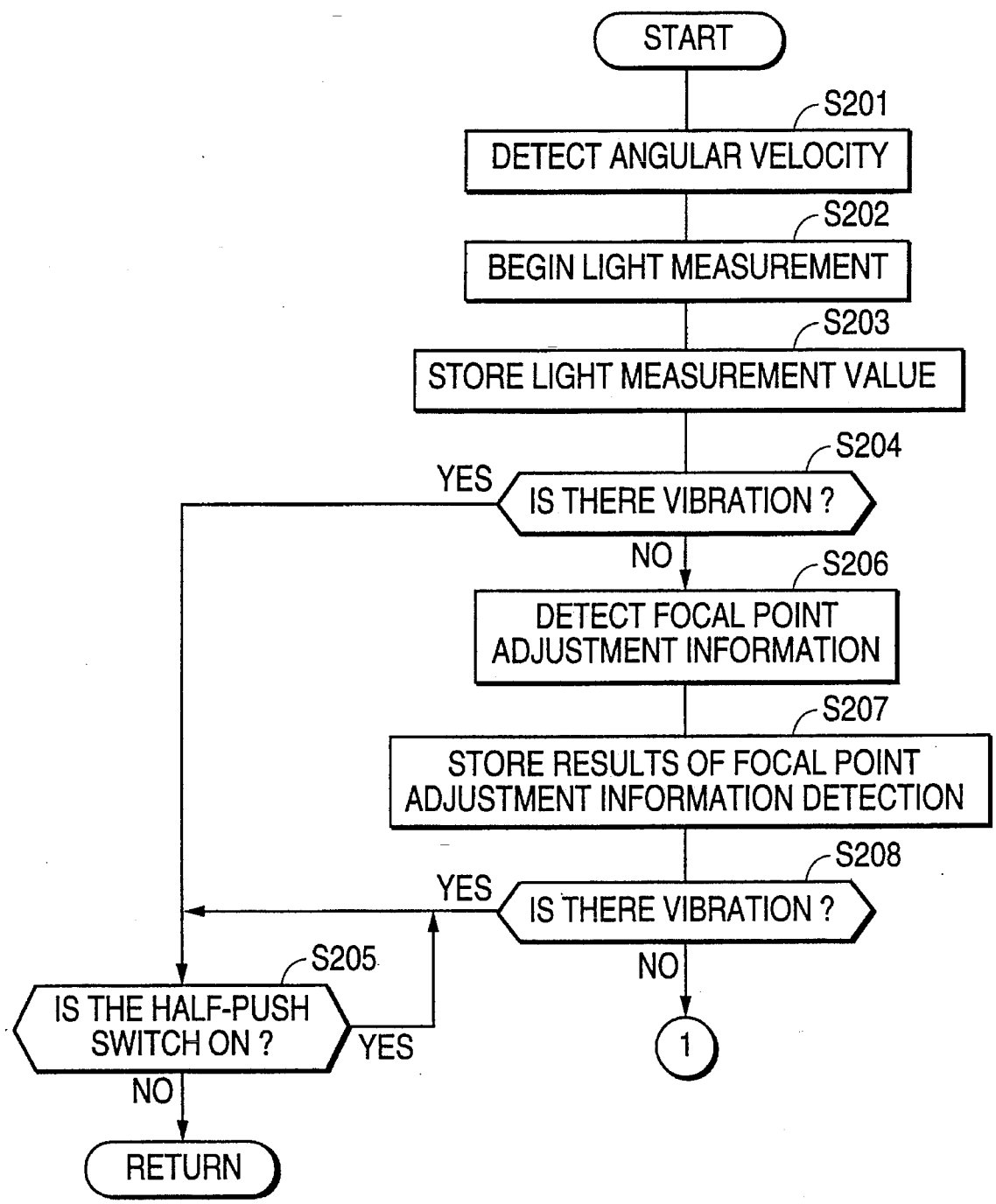
FIG. 5 is a flow chart showing an operational process for vibration compensation in accordance with a second embodiment of the present invention.

FIG. 5 is a flow chart showing an operational process for performing vibration compensation in accordance with a second embodiment of the present invention. The process performed according to the flow chart of FIG. 5 corresponds to the vibration compensation processing performed in step S3 of FIG. 2. In accordance with the second embodiment of the present invention, if vibration (particularly vibration due to hand tremor) is detected during light measurement or during focal point adjustment information detection, photography is prohibited until the release button is pressed halfway again.

Referring now to FIG. 5, vibration compensation in accordance with the second embodiment of the invention begins when angular velocity detection circuits 2A and 2B begin detecting angular velocity (step S201) caused by vibration. Next, light measurement device 4 begins light measurement (step S202). The light measurement value measured by light measurement device 4 is stored (step S203) in memory, and it is determined (step S204) whether or not vibration has been produced during light measurement based on the output of angular velocity detection circuits 2A and 2B. If it is determined that vibration has been produced during light measurement, it is then determined (step S205) whether or not half-push switch 10 is ON. If the half-push switch 10 is ON, step S205 is repeated; however, if the half-push switch 10 is not ON, control returns to the main operational process shown in FIG. 2. As a result of the above-described operations, photography is prohibited until the release button which has been half-pressed once is half-pressed again.

If the decision at step S204 is negative, and no vibration is detected during light measurement, the AF device 5 begins detecting (step S206) focal point adjustment information. The focal point adjustment information detection value detected by the AF device 5 is stored in memory (step S207), and it is determined (step S208) whether or not vibration has been produced during focal point adjustment information detection. If vibration has been detected during focal point adjustment information detection, it is then determined whether the half-push switch 10 is ON (step S205). If the half-push switch 10 is ON, photography is prohibited until the release button is half pressed again. However, if it is determined in step S208 that vibration has not been produced, the operational process continues at step S118 (FIG. 4), and the operational process described in steps S118–S127 with respect to the first embodiment is conducted.

In accordance with the second embodiment of the present invention, when the release button is half pressed, if vibration is detected during light measurement or during focal point adjustment information detection, photography is prohibited until the release button is half pressed again. As a result, lack of focus and exposure discrepancies caused by vibration are completely eliminated because photography is prohibited when vibration has been detected during light measurement or focal point adjustment information detection, and no wasted photography occurs.

Figure 6:
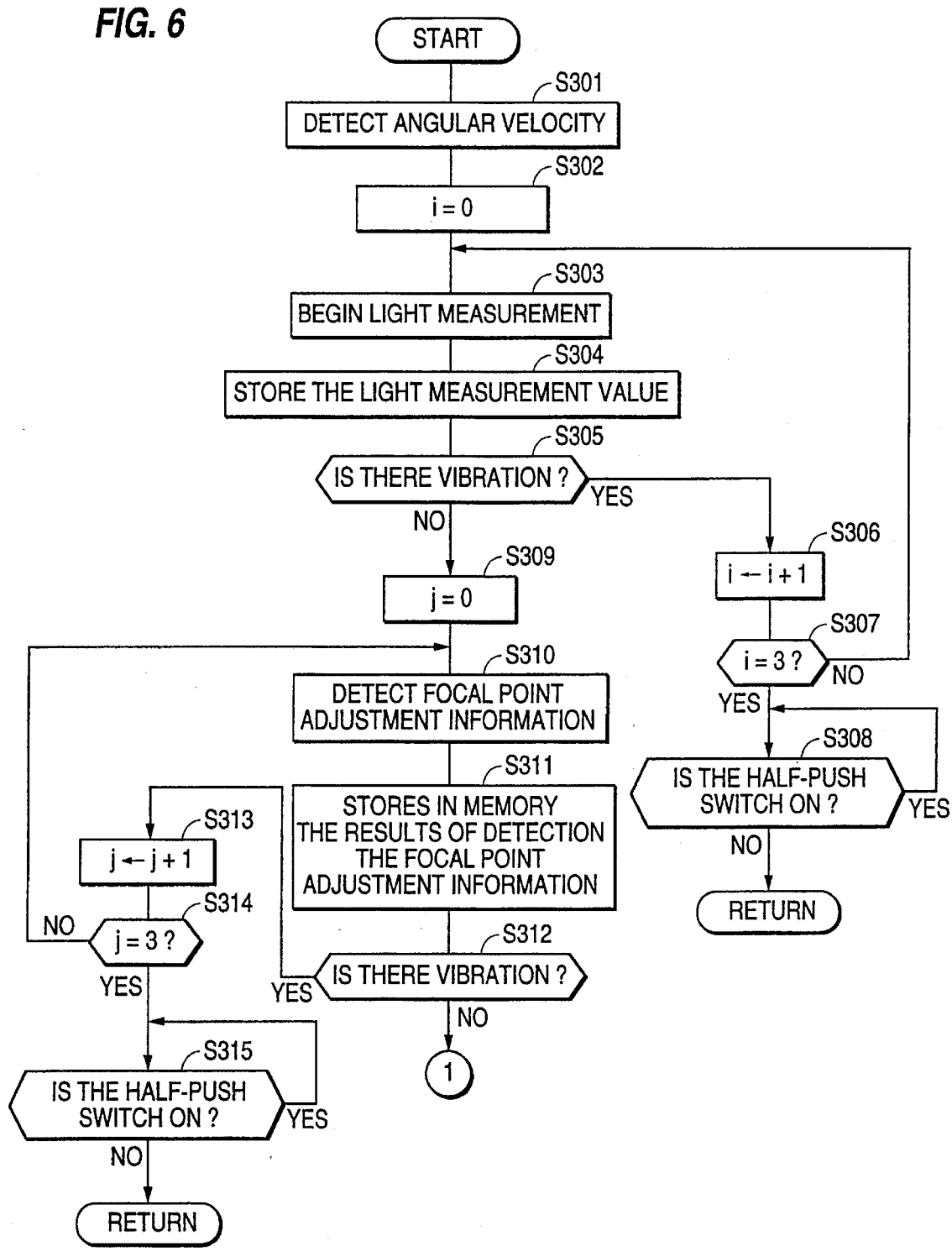
FIG. 6 is a flow chart showing an operational process for vibration compensation in accordance with a third embodiment of the present invention.

FIG. 6 is a flow chart showing an operational process for performing vibration compensation in accordance with a third embodiment of the present invention. The process performed according to the flow chart of FIG. 6 corresponds to the vibration compensation processing performed in step S3 of FIG. 2.

In accordance with the third embodiment of the present invention, light measurement or focal point adjustment information detection is repeated if vibration, particularly vibration caused by hand tremor, is detected during the light measurement or focal point adjustment information detection. Photography is prohibited if vibration is detected after a predetermined number of repetitions of a light measurement or a focal point adjustment information detection.

Referring now to FIG. 6, first, in steps S301–S307 the same operations are performed as described with respect to steps S101–S107 shown in FIG. 3, and a description of these operations is not repeated in detail here. The operations performed in steps S301–S307 serve to perform and store the results of up to three successive light measurement operations. Then, it is determined (step S308) whether or not half-push switch 10 is ON. If the half-push switch 10 is ON, the operational process waits at step S308 until it is determined that the half-push switch 10 is not ON. When it is determined that the half-push switch 10 is not ON, the operational process then returns to the main routine shown in FIG. 2. In accordance with the above-described steps, if vibration is still detected after conducting light measurement three times, photography is prohibited.

If vibration is not detected during light measurement in step S305, steps S309–S314 are performed which comprise the same operations as described with respect to steps S110–S115 in FIG. 3, and a description of these operations is not repeated in detail here. The operations performed in steps S309–S314 serve to perform and store the results of up to three successive focal point adjustment information detection operations. Then, it is determined (step S315) whether or not half-push switch 10 is ON. If the half-push switch 10 is ON, the operational process waits at step S315 until it is determined that the half-push switch 10 is not ON. When it is determined that the half-push switch 10 is not ON, the operational process returns to the main process shown in FIG. 2. If vibration is not detected at step S312, the process continues at step S118 (FIG. 4), and afterwards, the same operations are conducted as described with respect to the first embodiment.

In accordance with the third embodiment of the present invention, if vibration is detected during light measurement or during focal point adjustment information detection, light measurement or focal point adjustment information detection is repeated, and photography is prohibited if vibration is still detected after repeating the light measurement or focal point adjustment information detection a specified number of times. Accordingly, there will be fewer cases of photography being prohibited than with the second embodiment, and fewer repetitions of the troublesome operation of pressing the release button half way again will be required.

FIG. 7 is a flow chart showing an operational process for performing vibration compensation in accordance with a fourth embodiment of the present invention. The operational process performed according to the flow chart of FIG. 7 corresponds to the vibration compensation processing performed in step S3 of FIG. 2.

In accordance with the fourth embodiment of the present invention, light measurement or focal point adjustment information detection is repeated if vibration is detected during a light measurement or focal point adjustment information detection, and if vibration is still detected after repeating the light measurement or focal point adjustment information detection a specified number of times, the light measurement value or focal point adjustment information detection value that was last conducted is selected as the value to be used during photography.

Referring to FIG. 7, first in steps S401–S406, the same operations described with respect to steps S101–S106 shown in FIG. 3 are performed, and a detailed description of these steps is not provided here. Next, it is determined (step S407) whether or not a variable i, indicating a number of light measurements, is three (3). If the variable i is not three (3), light measurement is conducted again (step S403); however, if the variable i is three (3), the operational process advances to step S408. In accordance with the operations performed in steps S401–S408, if vibration is detected during each of three successive light measurement operations, the light measurement value detected during the final light measurement is selected as the light measurement value to be used during photography.

The operations performed in steps S408–S412 are the same operations as described with respect to steps S110–S114 in FIG. 3, and a detailed description of these steps in not provided here. At step S413, it is determined whether or not a variable j, which indicates the number of times focal point adjustment information is detected, is three (3). If the variable j is not three (3), the operational process returns to step S409 and focal point adjustment information detection is conducted again; however, if the variable j is three (3), the operational process continues in step S118 (FIG. 4). In accordance with the operations performed in steps S409–S413, if vibration is detected during each of three successive focal point adjustment information detections, the focal point adjustment information detection value detected during the final detection operation is selected as the focal point adjustment information to be used during photography.

In accordance with the fourth embodiment of the present invention, if vibration is detected during light measurement or during focal adjustment information detection, the light measurement or focal point adjustment information detection during which vibration was detected is repeated. If vibration is still detected after repeating the light measurement or focal point adjustment information detection a specified number of times, the light measurement value or focal point adjustment information detection value last detected (i.e., the most recent value detected) is selected as the value to be used during photography. Therefore, in accordance with the fourth embodiment of the present invention, photography is possible even if vibration is produced. Moreover, even if photography is conducted when vibration is detected, because exposure control or focal point adjustment is conducted using the most recent light measurement value or focal point adjustment information detection value, the effect of errors in the light measurement value and focal point adjustment information value caused by vibration can be kept to the minimum.

Although the preferred embodiments of the invention have been described with respect to performing three repetitions of light measurement and focal point adjustment information detection, the number of times light measurement or focal point adjustment information detection is performed is not limited to three, and the number of times these operations are repeated may vary.

Further, although in accordance with the preferred embodiments of the invention the light measurement processing and the focal point adjustment information detection processing have been described as occurring independently, the different types of processing may be performed in various combinations. For example, if vibration is detected during each of three light measurement operations or focal point adjustment information detection operations, it would be possible to compute the average value of the light measurement operations, as described with respect to the first embodiment, and to select the most recent focal point adjustment information detection value, as described with respect to the fourth embodiment.

Although in accordance with the preferred embodiments of the present invention, focal point adjustment information detection is conducted after light measurement is conducted, light measurement may be performed after conducting focal point adjustment information detection. Furthermore, light measurement may be conducted before the release button is half pressed.

Furthermore, although in accordance with the preferred embodiments of the invention vibration compensation is performed by moving the compensation lens 101 provided within the photographic lens, the device for performing vibration compensation is not limited to moving the compensation lens 101 and, for example, a film plane may be moved corresponding to the detected vibration.

Although the preferred embodiments of the invention have been described with respect to vibration compensation beginning after having fully pressed the release button and prior to opening the shutter, the time during which vibration compensation processing begins is not limited to that described above with respect to the preferred embodiments, and may be conducted during the period of exposure.

Although the preferred embodiments of the invention have been described with respect to compensating for vibration during light measurement and focal point adjustment information detection operations, the present invention may be applied to compensating for vibration during measurement of any type of photographic information whose measurement result may be affected by vibration.

It will be appreciated by those skilled in the an that changes may be made in the embodiments without departing from the principles and spirit of the invention, the scope of which is defined in the claims and their equivalents.

What is claimed is:

1. A vibration compensation device to compensate for vibration in a camera during measurement of photographic information, comprising:

a light measurement device measuring brightness of a subject;

a focal point adjustment information detection device detecting focal point adjustment information;

a vibration detection device to detect whether vibration of the camera occurs during at least one of measurement of the brightness of the subject by the brightness measurement device and detection of focal point adjustment information by the focal point adjustment information detection device; and a control unit to detect a light measurement value to be used during photography and to select a focal point adjustment information detection value to be used during photography based on whether vibration is detected during at least one of measurement of the brightness of the subject and detection of focal point adjustment information.

2. A vibration compensation device as recited in claim 1, wherein the control unit controls the light measurement device to repeat light measurement when vibration is detected during a light measurement operation and controls the focal point adjustment information detection device to repeat focal adjustment information detection when vibration is detected during a focal point adjustment information detection operation.

3. A vibration compensation device as recited in claim 2, wherein the control unit controls the light measurement device to repeat light measurement each time vibration is detected during light measurement up to a predetermined number of repetitions, and controls the focal point adjustment information detection device to repeat focal point adjustment information detection each time vibration is detected during light measurement up to a predetermined number of repetitions.

4. A vibration compensation device as recited in claim 1, wherein the control unit selects as the light measurement value to be used during photography a light measurement value measured when no vibration is detected during light measurement and selects as the focal point adjustment information value to be used during photography the focal point adjustment information value detected when no vibration is detected during focal point adjustment information detection.

5. A vibration compensation device as recited in claim 3, wherein the control unit selects as the light measurement value to be used during photography an average value of the predetermined number of light measurement operations and selects as the focal point adjustment information to be used during photography an average value of the predetermined number of focal point adjustment information detection operations.

6. A vibration compensation device as recited in claim 3, further comprising a half-press switch, and wherein the light measurement device measures brightness of a subject and the focal point adjustment information detection device detects focal point adjustment information when the half-press switch is ON, and the control unit prevents photography until the half-press switch is switched ON again if vibration detected by the vibration detection device during at least one of the predetermined number of repetitions of light measurement and focal point adjustment information detection.

7. A vibration compensation device as recited in claim 3, wherein the control unit selects as the light measurement value and the focal point adjustment information to be used during photography the light measurement value last measured and the focal point adjustment information detection value last detected if vibration is detected during each of the predetermined number of repetitions of light measurement and focal point adjustment information detection, respectively.

8. A vibration compensation device as recited in claim 3, wherein the control unit prohibits photography when vibration is detected during at least one of each of the predetermined number of repetitions of light measurement and each of the predetermined number of repetitions of focal point adjustment information detection.

9. A vibration compensation device for a camera, comprising:

a measuring device measuring photographic information;

a vibration detection device to detect whether vibration of the camera occurs during measurement of photographic information; and a decision unit, operatively coupled to the measuring device and to the vibration detection device, to select photographic information to be used during photography based on whether vibration is detected during operation of the measuring device.

10. A vibration compensation device as recited in claim 9, wherein the decision unit selects photographic information measured when the vibration detection device detects that no camera vibration occurring.

11. A vibration compensation device as recited in claim 9, wherein the decision unit selects an average value of a predetermined number of photographic information measurements when vibration is detected during a predetermined number of successive photographic information measurements.

12. A vibration compensation device as recited in claim 9, wherein the decision unit prohibits photography when vibration is detected during a predetermined number of successive photographic information measurements.

13. A vibration compensation device as recited in claim 9, wherein the control unit selects a most recent photographic information measurement result when vibration is detected during a predetermined number of successive photographic information measurements.

14. A vibration compensation device as recited in claim 9, further comprising a release button half-press switch which is ON when a release button is half-pressed, wherein the measuring device measures photographic information when the half-press switch is ON, and the decision unit prevents photography until the half-press switch is ON again when vibration is detected during a predetermined number of successive photographic information measurements.

15. A device for compensating for vibration of a camera during measurement of photographic information to control exposure during photography, comprising:

a release button half-press switch;

a light measurement device measuring brightness of a subject when the half-press switch is ON;

a focal point adjustment information detection device detecting focus adjustment information when the half-press switch is ON;

a vibration detection device to detect vibration of the camera;

a control unit controlling the light measurement device and focal point adjustment information detection device to perform light measurement and focal point adjustment information detection, respectively, and to repeat the light measurement and the focal point adjustment information detection when vibration is detected during a light measurement operation and a focal point adjustment information detection operation, respectively; and a decision unit selecting, for photography, one of an average value of a predetermined number of light measurement operations when vibration is detected during each of the predetermined number of light measurement operations, a light measurement value measured when no vibration is detected, and a most recent of the predetermined number of light measurement operations, and selecting, for photography, one of an average value of a predetermined number of focal point adjustment information detection operations, a focal point adjustment information value detected when no vibration occurs, and a most recent of the predetermined number of focal point adjustment information detection operations.

16. A method for compensating for vibration in a camera, comprising:

measuring photographic information;

detecting whether vibration of the camera occurs during measuring the photographic information; and selecting a value of the measured photographic information to be used during photography based on whether vibration of the camera is detected during measuring photographic information.

17. A method for compensating for vibration as recited in claim 16, wherein the selecting step comprises:

selecting as a photographic information value a value measured when no vibration is detected.

18. A method for compensating for vibration as recited in claim 16, wherein the selecting step comprises:

repeating the measuring of photographic information a predetermined number of times when vibration is detected during the measuring of photographic information; and selecting as a photographic information value an average value of the predetermined number of measurements.

19. A method for compensating for vibration as recited in claim 16, wherein the selecting step comprises:

repeating the measuring of photographic information a predetermined number of times when vibration is detected during the measuring of photographic information; and selecting as a photographic information value a most recent photographic information value of the predetermined number of repetitions of photographic information measurement.

20. A vibration compensation device to compensate for vibration in a camera during measurement of photographic information, comprising:

a light measurement device measuring brightness of a subject;

a focal point adjustment information detection device detecting focal point adjustment information;

a vibration detection device detecting vibration of the camera;

a half-press switch to initiate the light measurement device to measure brightness of a subject and the focal point adjustment information detection device to detect focal point adjustment information when the half-press switch is ON;

a control unit to control the light measurement device to repeat light measurement when vibration is detected during a light measurement operation up to a predetermined number of repetitions, and to control the focal point adjustment information detection device to repeat focal adjustment information detection when vibration is detected during a focal point adjustment information detection operation up to a predetermined number of repetitions, and to determine a light measurement value to be used during photography and a focal point adjustment information detection value to be used during photography based on the detected vibration, wherein the control unit prevents photography until the half-press switch is switched ON, and prevents photography until the half-press switch is switched ON again if vibration is detected by the vibration detection device during at least one of the predetermined number of repetitions of light measurement and focal point adjustment information detection.

21. A vibration compensation device to compensate for vibration in a camera during measurement of photographic information, comprising:

a light measurement device measuring brightness of a subject;

a focal point adjustment information detection device detecting focal point adjustment information;

a vibration detection device detecting vibration of the camera; and a control unit to control the light measurement device to repeat light measurement when vibration is detected during a light measurement operation up to a predetermined number of repetitions, and to control the focal point adjustment information detection device to repeat focal adjustment information detection when vibration is detected during a focal point adjustment information detection operation up to a predetermined number of repetitions, and to determine a light measurement value used during photography and a focal point adjustment information detection value to be used during photography based on the detected vibration, wherein the control unit determines the light measurement value and the focal point adjustment information to be used during photography based, respectively, on the results of the light measurement last conducted and on the results of the focal point adjustment information detection last conducted if vibration is detected during each of the predetermined number of repetitions of light measurement and focal point adjustment information detection, respectively.

22. A vibration compensation device for a camera, comprising:

a measuring device measuring photographic information;

a vibration detection device detecting vibration of the camera; and a decision unit, operatively coupled to the measuring device and to the vibration detection device, to select photographic information to be used during photography based on whether vibration is detected during operation of the measuring device, wherein the decision unit selects an average value of a predetermined number of successive photographic information measurements when vibration is detected during the predetermined number of successive photographic information measurements.

23. A vibration compensation device for a camera, comprising:

a measuring device measuring photographic information;

a vibration detection device detecting vibration of the camera;

a release button half-press switch which is ON when a release button is half-pressed, wherein the measuring device measures photographic information when the half-press switch is ON;

a decision unit, operatively coupled to the measuring device and to the vibration detection device, to select photographic information to be used during photography based on whether vibration is detected during operation of the measuring device, wherein the decision unit prevents photography until the half-press switch is switched ON again when vibration is detected during a predetermined number of successive photographic information measurements.

24. A method for compensating for vibration in a camera, comprising:

measuring photographic information;

detecting vibration of the camera;

determining whether vibration of the camera is detected during the measuring of photographic information;

repeating the measuring of photographic information a predetermined number of times when vibration is detected during the measuring of photographic information; and selecting as a photographic information value an average value of the predetermined number of measurements.

* * * * *

UNITED STATES PATENT AND TRADEMARK OFFICE
CERTIFICATE OF CORRECTION

PATENT NO. : 5,548,370

DATED : August 20, 1996

INVENTOR(S) : Toshiyuki NAKAMURA et al.

It is certified that error appears in the above-indentified patent and that said Letters Patent is hereby corrected as shown below:

Claim 1, Column 11, line 7, change "detect" to --select--.

Signed and Sealed this

Thirty-first Day of December, 1996

Attest:

BRUCE LEHMAN

*Attesting Officer*  *Commissioner of Patents and Trademarks*